(12) United States Patent
Wang

(10) Patent No.: US 8,545,026 B2
(45) Date of Patent: Oct. 1, 2013

(54) PROJECTOR AND METHOD FOR CORRECTING TRAPEZOID DISTORTION OF PROJECTED IMAGES USING THE PROJECTOR

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 13/010,793

(22) Filed: Jan. 21, 2011

(65) Prior Publication Data
US 2012/0062856 A1 Mar. 15, 2012

(30) Foreign Application Priority Data
Sep. 10, 2010 (CN) .......................... 2010 1 0278296

(51) Int. Cl.
*G03B 5/00* (2006.01)
(52) U.S. Cl.
USPC .............................................. 353/69; 353/70
(58) Field of Classification Search
USPC .............. 353/69, 70, 121, 101; 348/745–747
See application file for complete search history.

(56) References Cited

U.S. PATENT DOCUMENTS

| | | | | |
|---|---|---|---|---|
| 7,347,564 B2 * | 3/2008 | Matsumoto et al. | ............ | 353/69 |
| 7,441,906 B1 * | 10/2008 | Wang et al. | ...................... | 353/70 |
| 8,382,291 B2 * | 2/2013 | Kubota | ............................ | 353/70 |

\* cited by examiner

*Primary Examiner* — Tony Ko
(74) *Attorney, Agent, or Firm* — Altis & Wispro Law Group, Inc.

(57) ABSTRACT

A method corrects trapezoid distortion of projected images using a projector. The projector includes a projection lens, a driver device, an image capturing device, and a storage system. A rectangular picture is read from the storage system and projected on a projection area by the projection lens. The method controls the image capturing device to capture an image from the projection area when the projection lens increases one trapezoid row correction grade, and corrects each trapezoid row of the captured image if the captured image has trapezoid rows. The method further controls the image capturing device to capture an image from the projection area when the projection lens increases one trapezoid column correction grade, and corrects each trapezoid column of the captured image if the captured image has trapezoid columns.

16 Claims, 4 Drawing Sheets (A)

(B)

(A)

(B)

PROJECTOR AND METHOD FOR CORRECTING TRAPEZOID DISTORTION OF PROJECTED IMAGES USING THE PROJECTOR

BACKGROUND

1. Technical Field

Embodiments of the present disclosure relate to optical devices and methods for adjusting the optical devices, and particularly to a projector and a method for correcting trapezoid distortion of an image projected by the projector.

2. Description of Related Art

Projectors can project an original image on a screen. When a projector is installed in such a manner that an optical axis of a projection lens of the projector accords with a normal line of the screen, a projected image similar to the original image is projected as a normal rectangular picture on the screen without a trapezoid distortion. The trapezoid distortion is also called a keystone distortion that is defined as a type of geometric distortion where the vertical edges of the projected image slant inwards towards the top horizontal edge.

Projectors are generally installed on a place where the projector does not accord with the normal line of the screen, for instance, on a floor, or on a ceiling in a suspended state. In such a case, the trapezoid distortion may occur on the projected image. To avoid the trapezoid distortion on the projected image, various kinds of countermeasures have been proposed, such as an optical compensation method. However, there is a problem that the production cost of the projector becomes very high, and it is difficult to obtain a largely magnified projected image having a high quality.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
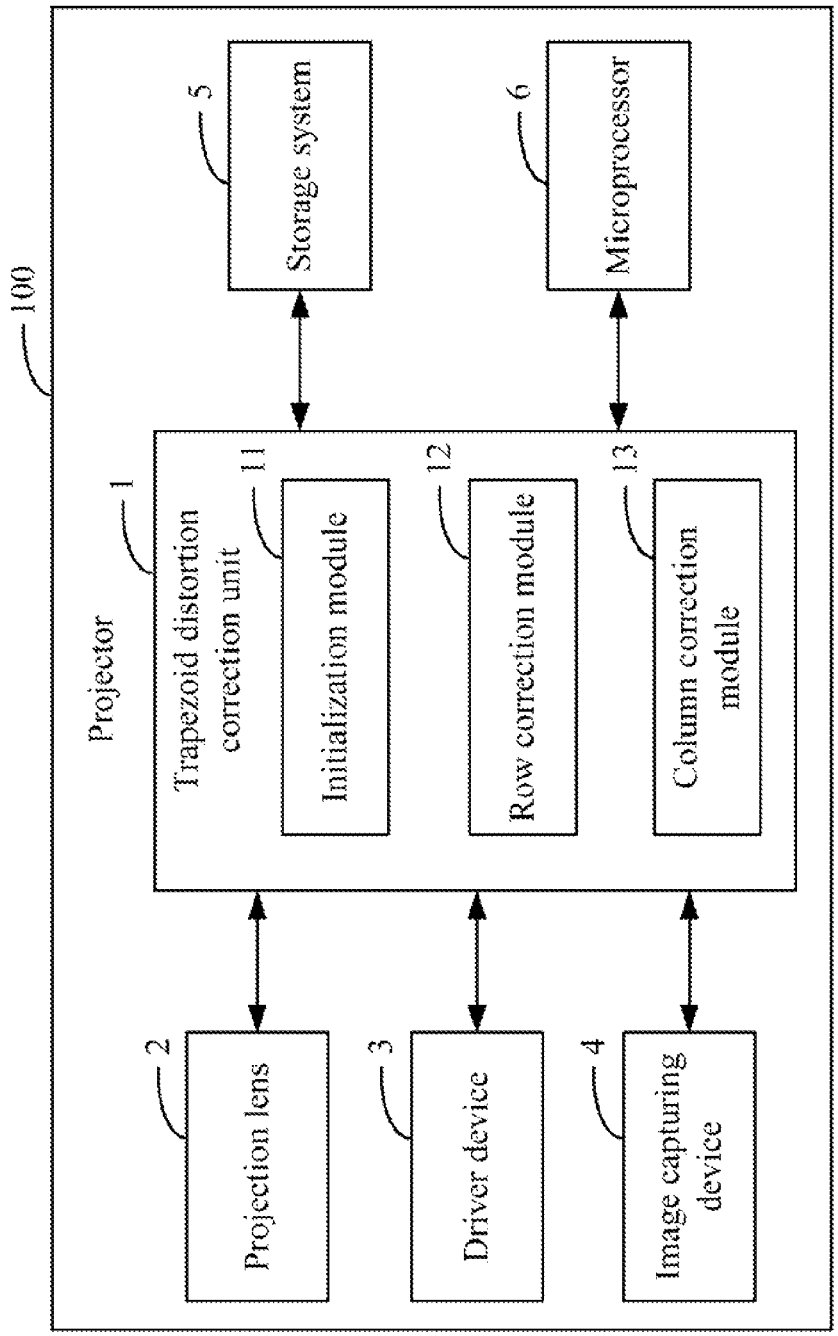
FIG. 1 is a block diagram of one embodiment of a projector.

FIG. 1 is a block diagram of one embodiment of a projector 100. In the embodiment, the projector 100 includes a trapezoid distortion correction unit 1, a projection lens 2, a driver device 3, an image capturing device 4, a storage system 5, and a least one microprocessor 6. It should be understood that FIG. 1 illustrates only one example of the projector 100, and may include more or fewer components than illustrated, or a different configuration of the various components in other embodiments.

Figure 2:
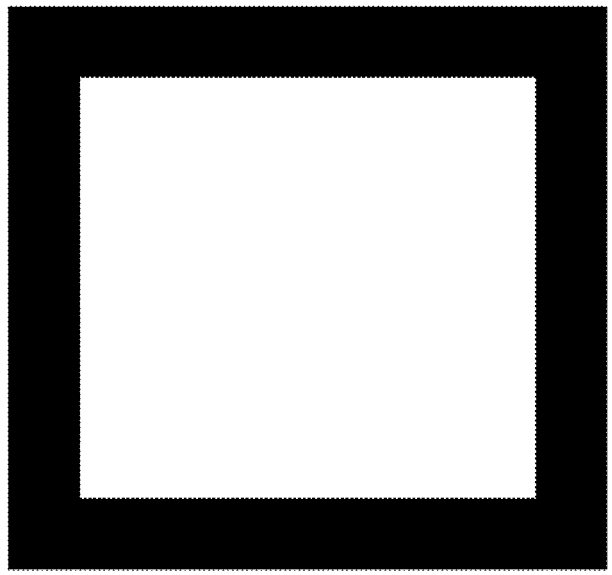
FIG. 2 is a schematic diagram illustrating one example of a trapezoid distortion of a projected image.
Figure 2:
Figure 2:
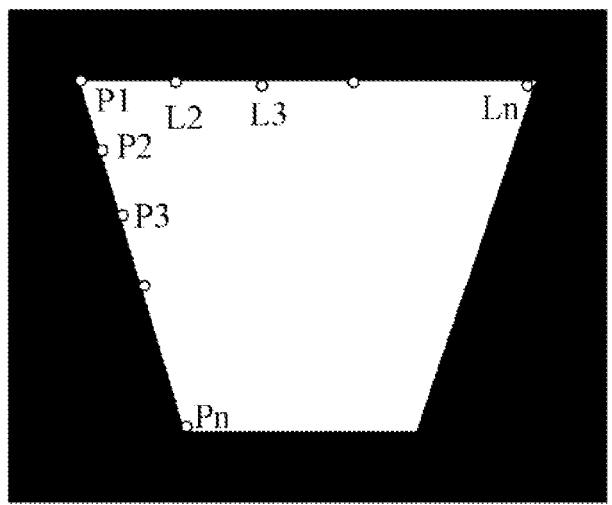

In one embodiment, the trapezoid distortion correction unit 1 may comprise computerized code in the form of one or more programs that are stored in the storage system 5 and executed by the at least one microprocessor 6. When the projector 100 projects an original picture (e.g., a rectangular picture as shown in FIG. 2A) on a projection area, such as a wall surface or a display screen, the trapezoid distortion correction unit 1 can automatically correct a trapezoid distortion of a projected image (e.g., a trapezoid picture as shown in FIG. 2B) to obtain a normal shaped image having similar proportions (i.e., ratios of width and length of the projected image being proportional to ratios of width and length of the projected image) as the original picture. The trapezoid distortion may occur on the projected image when the projector 10 is installed on a place where the projector does not accord with the normal line of the screen, for instance, on a floor, or on a ceiling in a suspended state.

The projection lens 2 is an optical lens which is operable to project the original picture on the projection area, and correct a projected image having trapezoid distortion to a normal shape similar to the original picture by adjusting a trapezoid distortion correction grade of the projection lens 2. In one embodiment, the trapezoid distortion correction grade is engraved on the projection lens 2, and includes a trapezoid row correction grade having a grade range from −10 to +10 grades, and a trapezoid column correction grade having a grade range from −10 to +10 grades. Where the correction grade −10 grade is an initial trapezoid correction grade, and the correction grade +10 grade is a top trapezoid correction grade.

The driver device 3 is operable to control the projection lens 2 to move by every grade from the initial trapezoid correction grade to the top trapezoid correction grade, so as to correct the trapezoid distortion of the projected image during the process of projecting the original picture on the projection area. In one embodiment, the driver device 3 may be a driving motor that can drive the projection lens 2 automatically.

The image capturing device 4 is operable to capture images from the projection area when the projection lens 2 moves by every trapezoid correction grade, and send each of the captured images to the trapezoid distortion correction unit 1. In one embodiment, the image capturing device 4 may be a camera device.

The storage system 5 stores a predefined picture that has a special shape, such as a rectangular picture as shown in FIG. 2A, for example. In one embodiment, the storage system 5 may be an internal storage device, such as a random access memory (RAM) for temporary storage of information, and/or a read only memory (ROM) for permanent storage of information. In some embodiments, the storage system 5 may also be an external storage device, such as an external hard disk, a storage card, or a data storage medium.

In one embodiment, the trapezoid distortion correction unit 1 includes an initialization module 11, a row correction module 12, and a column correction module 13. The modules 11-13 may comprise computerized code in the form of one or more programs that are stored in the storage system 5. The computerized code includes instructions that are executed by the at least one microprocessor 6 to provide functions for implementing the modules 11-13. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The initialization module 11 is operable to read the predefined picture from the storage system 5, and control the projection lens 2 to project the predefined picture on the projection area. In addition, the initialization module 11 drives the driver device 3 to control the projection lens 2 to move at the initial row and trapezoid column correction grade (i.e., the −10 correction grade) of the correction grade range when the projector 100 is powered on.

The row correction module 12 is operable to control the image capturing device 4 to capture an image of the predefined picture from the projection area when the projection lens 2 moves by one trapezoid row correction grade. The row correction module 12 is further operable to determine whether the captured image has trapezoid rows. When the captured image has trapezoid rows, the row correction module 12 corrects each trapezoid row of the captured image according to pixel coordinates of the first white pixel point in each trapezoid row of the captured image. Referring to FIG. 2B, each of the initial row positions is denoted as a position P1, P2, P3, . . . , or Pn. A correction method of the trapezoid row distortion of the captured image is described as FIG. 3 in detail.

The column correction module 13 is operable to control the image capturing device 4 to capture an image of the predefined picture from the projection area when the projection lens 2 moves by one trapezoid column correction grade. The column correction module 13 is further operable to determine whether the captured image has trapezoid columns. When the captured image has trapezoid columns, the column correction module 13 corrects each trapezoid column of the captured image according to the pixel coordinates of the first white pixel point in each trapezoid column of the captured image. Referring to FIG. 2B, each of the initial column positions is denoted as a position L1, L2, L3, . . . , or Ln. A correction method of the trapezoid column distortion of the captured image is described as FIG. 4 in detail.

Figure 3:
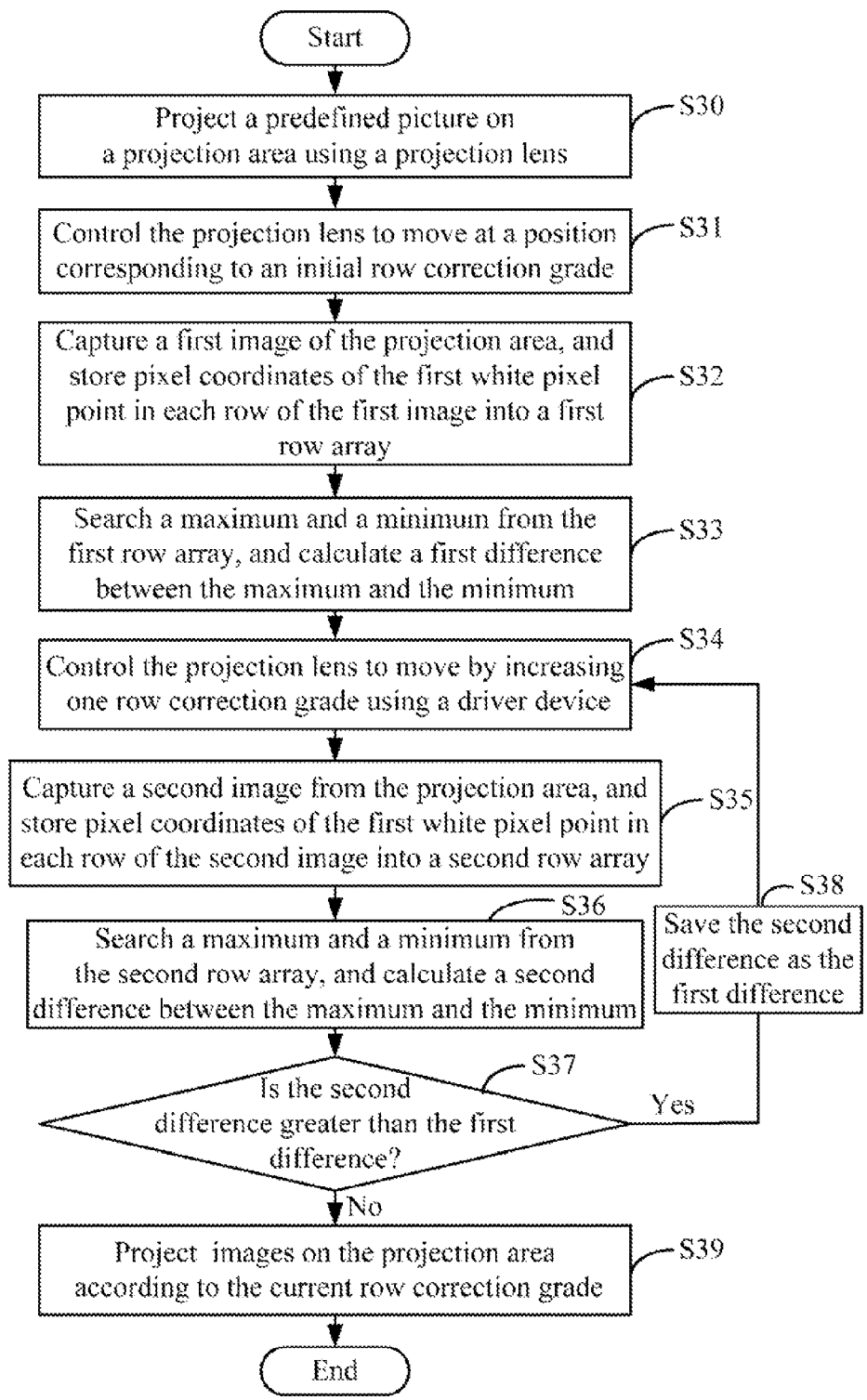
FIG. 3 is a flowchart of one embodiment of a method for correcting trapezoid row distortion of a projected image using the projector of FIG. 1.

FIG. 3 is a flowchart of one embodiment of a method for correcting trapezoid row distortion of an image using the projector 100 of FIG. 1. Depending on the embodiment, additional blocks may be added, others removed, and the ordering of the blocks may be changed.

In block S30, initialization module 11 reads a predefined picture from the storage system 5, and controls the projection lens 2 to project the predefined picture on a projection area, such as a wall surface or a display screen, for example. In block S31, the initialization module 11 drives the driver device 3 to control the projection lens 2 to move at a position corresponding to an initial trapezoid row correction grade when the projector 100 is powered on.

In block S32, the row correction module 12 controls the image capturing device 4 to capture a first image from the projection area, and stores pixel coordinates of the first white pixel point in each row of the first image into a first row array. In block S33, the row correction module 12 searches a maximum and a minimum from the first row array, and calculates a first difference between the maximum and the minimum.

In block S34, the row correction module 12 controls the projection lens 2 to move by increasing one trapezoid row correction grade using the driver device 3. In block S35, the row correction module 12 controls the image capturing device 4 to capture a second image o from the projection area, and stores pixel coordinates of the first white pixel point in each row of the second image into a second row array. In block S36, the row correction module 12 searches a maximum and a minimum from the second row array, and calculates a second difference between the maximum and the minimum.

In block S37, the row correction module 12 determines whether the second difference is greater than the first difference. If the second difference is greater than the first difference, block S38 is implemented. Otherwise, if the second difference is not greater than the first difference, block S39 is implemented.

In block S38, the row correction module 12 saves the second difference as the first difference, and the flow goes to block S34. In block S39, the row correction module 12 controls the projection lens 2 to move back by decreasing one trapezoid row correction grade using the driver device 3, and saves the current trapezoid row correction grade as an optimal trapezoid row correction grade into the storage system 5. As such, the projector 100 can project different images on the projection area according to the optimal trapezoid row correction grade.

Figure 4:
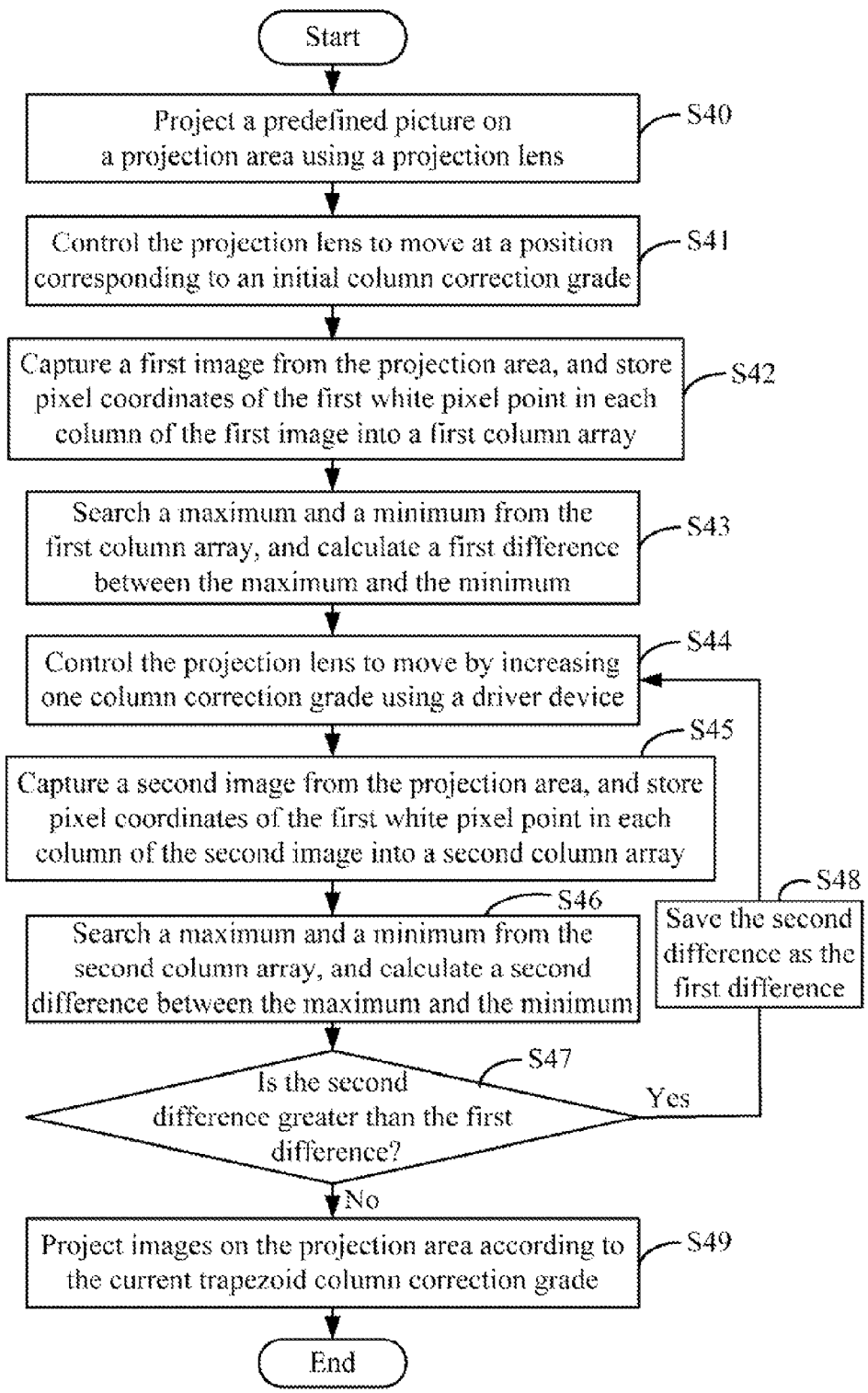
FIG. 4 is a flowchart of one embodiment of a method for correcting trapezoid column distortion of a projected image using the projector of FIG. 1.

FIG. 4 is a flowchart of one embodiment of a method for correcting trapezoid column distortion of an image using the projector 100 of FIG. 1. Depending on the embodiment, additional blocks may be added, others removed, and the ordering of the blocks may be changed.

In block S40, initialization module 11 reads a predefined picture from the storage system 5, and controls the projection lens 2 to project the predefined picture on a projection area, such as a wall surface or a display screen, for example. In block S41, the initialization module 11 drives the driver device 3 to control the projection lens 2 to move at a position corresponding to an initial trapezoid column correction grade when the projector 100 is powered on.

In block S42, the column correction module 13 controls the image capturing device 4 to capture a first image from the projection area, and stores pixel coordinates of the first white pixel point in each column of the first image into a first column array. In block S33, the column correction module 13 searches a maximum and a minimum from the first column array, and calculates a first difference between the maximum and the minimum.

In block S44, the column correction module 13 controls the projection lens 2 to move by increasing one trapezoid column correction grade using the driver device 3. In block S45, the column correction module 13 controls the image capturing device 4 to capture a second image from the projection area, and stores pixel coordinates of the first white pixel point in each column of the second image into a second column array. In block S46, the column correction module 13 searches a maximum and a minimum from the second column array, and calculates a second difference between the maximum and the minimum.

In block S47, the column correction module 13 determines whether the second difference is greater than the first difference. If the second difference is greater than the first difference, block S48 is implemented. Otherwise, if the second difference is not greater than the first difference, block S49 is implemented.

In block S48, the column correction module 13 saves the second difference as the first difference, and the flow goes to block S44. In block S49, the column correction module 13 controls the projection lens 2 to move back by decreasing one trapezoid column correction grade using the driver device 3, and saves the current trapezoid column correction grade as an optimal trapezoid column correction grade into the storage system 5. As such, the projector 100 can project different images on the projection area according to the optimal trapezoid column correction grade.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A projector, comprising:
   a projection lens, an image capturing device, and a storage system; and
   one or more programs stored in the storage system and executable by at least one microprocessor, the one or more programs comprising:
   an initialization module operable to read a rectangular picture from the storage system, and control the projection lens to project the rectangular picture on a projection area;
   a row correction module operable to control the image capturing device to capture an image of the rectangular picture from the projection area when the projection lens moves by every trapezoid row correction grade, determine whether the captured image has trapezoid rows, and correct each trapezoid row of the captured image according to pixel coordinates of the first pixel point in each trapezoid row of the captured image if the captured image has trapezoid rows; and
   a column correction module operable to control the image capturing device to capture an image of the captured image from the projection area when the projection lens moves by every trapezoid column correction grade, determine whether the captured image has trapezoid columns, and correct each trapezoid column of the captured image according to pixel coordinates of the first pixel point in each trapezoid column of the captured image if the captured image has trapezoid columns.

2. The projector according to claim 1, wherein the initialization module is further operable to drive the driver device to control the projection lens to move at a position corresponding to an initial trapezoid row correction grade when the projector is powered on.

3. The projector according to claim 2, wherein the trapezoid rows of the captured image are corrected by steps of:
   (a1) capturing a first image from the projection area when the projection lens moves at the position corresponding to the initial trapezoid row correction grade, and storing pixel coordinates of the first pixel point in each row of the first image into a first row array;
   (a2) searching a maximum and a minimum from the first row array, and calculating a first difference between the maximum and the minimum;
   (a3) controlling the projection lens to move by increasing a trapezoid row correction grade using the driver device;
   (a4) capturing a second image from the projection area, and storing pixel coordinates of the first pixel point in each row of the second image into a second row array;
   (a5) searching a maximum and a minimum from the second row array, and calculating a second difference between the maximum and the minimum;
   (a6) determining whether the second difference is greater than the first difference;
   (a7) saving the second difference as the first difference if the second difference is greater than the first difference, and repeating from the step (a3) to the step (a6); or
   (a8) controlling the projection lens to move back by decreasing one trapezoid row correction grade using the driver device, and saving the current trapezoid row correction grade as an optimal trapezoid row correction grade into the storage system if the second difference is not greater than the first difference; and
   (a9) projecting the rectangular picture on the projection area according to the optimal trapezoid row correction grade.

4. The projector according to claim 1, wherein the initialization module is further operable to drive the driver device to control the projection lens to move at a position corresponding to an initial trapezoid column correction grade when the projector is powered on.

5. The projector according to claim 4, wherein the trapezoid columns of the captured image are corrected by steps of:
   (b1) capturing a first image from the projection area when the projection lens to move at the position corresponding to the initial trapezoid column correction grade, and storing pixel coordinates of the first white pixel point in each column of the first image into a first row array;
   (b2) searching a maximum and a minimum from the first column array, and calculating a first difference between the maximum and the minimum;
   (b3) controlling the projection lens to move by increasing one trapezoid column correction grade using the driver device;
   (b4) capturing a second image from the projection area, and storing pixel coordinates of the first white pixel point in each column of the second image into a second column array;
   (b5) searching a maximum and a minimum from the second column array, and calculating a second difference between the maximum and the minimum;
   (b6) determining whether the second difference is greater than the first difference;
   (b7) saving the second difference as the first difference if the second difference is greater than the first difference, and repeating from the step (b3) to the step (b6); or
   (b8) controlling the projection lens to move back by decreasing one trapezoid column correction grade using the driver device, and saving the current trapezoid column correction grade as an optimal trapezoid column correction grade into the storage system if the second difference is not greater than the first difference; and
   (b9) projecting the rectangular picture on the projection area according to the optimal trapezoid column correction grade.

6. The projector according to claim 1, wherein the trapezoid row correction grade comprises twenty correction grades from a −10 grade to a +10 grade, and the trapezoid column correction grade comprises twenty correction grades from a −10 grade to a +10 grade.

7. A method for correcting trapezoid distortion of projected images using a projector, the projector comprising a projection lens, an image capturing device, and a storage system, the method comprising:
   reading a rectangular picture from the storage system, and controlling the projection lens to project the rectangular picture on a projection area;
   controlling the image capturing device to capture a projected image of the rectangular picture from the projection area when the projection lens moves at every trapezoid row correction grade;
   determining whether the captured image has trapezoid rows;
   correcting each trapezoid row of the captured image according to pixel coordinates of the first pixel point in each trapezoid row if the captured image has trapezoid rows;
   controlling the image capturing device to capture a projected image of the rectangular picture from the projection area when the projection lens moves at every trapezoid column correction grade;

determine whether the captured image has trapezoid columns; and correcting each trapezoid column of the captured image according to pixel coordinates of the first pixel point in each trapezoid column if the captured image has trapezoid columns.

8. The method according to claim 7, wherein the trapezoid rows of the captured image are determined by comparing each row of the captured image with the corresponding row of the rectangular picture, and the trapezoid columns of the captured image are determined by comparing each column of the captured image with the corresponding column of the rectangular picture.

9. The method according to claim 7, wherein the step of correcting the trapezoid rows of the captured image comprises:
   (a1) capturing a first image from the projection area when the projection lens moves at the position corresponding to the initial trapezoid row correction grade, and storing pixel coordinates of the first pixel point in each row of the first image into a first row array;
   (a2) searching a maximum and a minimum from the first row array, and calculating a first difference between the maximum and the minimum;
   (a3) controlling the projection lens to move by increasing a trapezoid row correction grade using the driver device;
   (a4) capturing a second image from the projection area, and storing pixel coordinates of the first pixel point in each row of the second image into a second row array;
   (a5) searching a maximum and a minimum from the second row array, and calculating a second difference between the maximum and the minimum;
   (a6) determining whether the second difference is greater than the first difference;
   (a7) saving the second difference as the first difference if the second difference is greater than the first difference, and repeating from the step (a3) to the step (a6); or
   (a8) controlling the projection lens to move back by decreasing one trapezoid row correction grade using the driver device, and saving the current trapezoid row correction grade as an optimal trapezoid row correction grade into the storage system if the second difference is not greater than the first difference; and
   (a9) projecting the rectangular picture on the projection area according to the optimal trapezoid row correction grade.

10. The method according to claim 7, wherein the step of correcting the trapezoid column of the captured image comprises:
   (b1) capturing a first image from the projection area when the projection lens to move at the position corresponding to the initial trapezoid column correction grade, and storing pixel coordinates of the first white pixel point in each column of the first image into a first row array;
   (b2) searching a maximum and a minimum from the first column array, and calculating a first difference between the maximum and the minimum;
   (b3) controlling the projection lens to move by increasing one trapezoid column correction grade using the driver device;
   (b4) capturing a second image from the projection area, and storing pixel coordinates of the first white pixel point in each column of the second image into a second column array;
   (b5) searching a maximum and a minimum from the second column array, and calculating a second difference between the maximum and the minimum;
   (b6) determining whether the second difference is greater than the first difference;
   (b7) saving the second difference as the first difference if the second difference is greater than the first difference, and repeating from the step (b3) to the step (b6); or
   (b8) controlling the projection lens to move back by decreasing one trapezoid column correction grade using the driver device, and saving the current trapezoid column correction grade as an optimal trapezoid column correction grade into the storage system if the second difference is not greater than the first difference; and
   (b9) projecting the rectangular picture on the projection area according to the optimal trapezoid column correction grade.

11. The method according to claim 7, wherein the trapezoid row correction grade comprises twenty correction grades from a −10 grade to a +10 grade, and the trapezoid column correction grade comprises twenty correction grades from a −10 grade to a +10 grade.

12. A non-transitory storage medium having stored thereon instructions that, when executed by at least one microprocessor of a projector, causes the microprocessor to perform a method for correcting trapezoid distortion of images projected by the projector, the projector comprising a projection lens, an image capturing device, and a storage system, the method comprising:
   reading a rectangular picture from the storage system, and controlling the projection lens to project the rectangular picture on a projection area;
   controlling the image capturing device to capture a projected image of the rectangular picture from the projection area when the projection lens moves at every trapezoid row correction grade;
   determining whether the captured image has trapezoid rows;
   correcting each trapezoid row of the captured image according to pixel coordinates of the first pixel point in each trapezoid row if the captured image has trapezoid rows;
   controlling the image capturing device to capture a projected image of the rectangular picture from the projection area when the projection lens moves at every trapezoid column correction grade;
   determine whether the captured image has trapezoid columns; and
   correcting each trapezoid column of the captured image according to pixel coordinates of the first pixel point in each trapezoid column if the captured image has trapezoid columns.

13. The storage medium according to claim 12, wherein the trapezoid rows of the captured image are determined by comparing each row of the captured image with the corresponding row of the rectangular picture, and the trapezoid columns of the captured image are determined by comparing each column of the captured image with the corresponding column of the rectangular picture.

14. The storage medium according to claim 12, wherein the step of correcting the trapezoid rows of the captured image comprises:
   (a1) capturing a first image from the projection area when the projection lens moves at the position corresponding to the initial trapezoid row correction grade, and storing pixel coordinates of the first pixel point in each row of the first image into a first row array;
   (a2) searching a maximum and a minimum from the first row array, and calculating a first difference between the maximum and the minimum;

(a3) controlling the projection lens to move by increasing a trapezoid row correction grade using the driver device;

(a4) capturing a second image from the projection area, and storing pixel coordinates of the first pixel point in each row of the second image into a second row array;

(a5) searching a maximum and a minimum from the second row array, and calculating a second difference between the maximum and the minimum;

(a6) determining whether the second difference is greater than the first difference;

(a7) saving the second difference as the first difference if the second difference is greater than the first difference, and repeating from the step (a3) to the step (a6); or (a8) controlling the projection lens to move back by decreasing one trapezoid row correction grade using the driver device, and saving the current trapezoid row correction grade as an optimal trapezoid row correction grade into the storage system if the second difference is not greater than the first difference; and (a9) projecting the rectangular picture on the projection area according to the optimal trapezoid row correction grade.

15. The storage medium according to claim 12, wherein the step of correcting the trapezoid column of the captured image comprises:

(b1) capturing a first image from the projection area when the projection lens to move at the position corresponding to the initial trapezoid column correction grade, and storing pixel coordinates of the first white pixel point in each column of the first image into a first row array;

(b2) searching a maximum and a minimum from the first column array, and calculating a first difference between the maximum and the minimum;

(b3) controlling the projection lens to move by increasing one trapezoid column correction grade using the driver device;

(b4) capturing a second image from the projection area, and storing pixel coordinates of the first white pixel point in each column of the second image into a second column array;

(b5) searching a maximum and a minimum from the second column array, and calculating a second difference between the maximum and the minimum;

(b6) determining whether the second difference is greater than the first difference;

(b7) saving the second difference as the first difference if the second difference is greater than the first difference, and repeating from the step (b3) to the step (b6); or (b8) controlling the projection lens to move back by decreasing one trapezoid column correction grade using the driver device, and saving the current trapezoid column correction grade as an optimal trapezoid column correction grade into the storage system if the second difference is not greater than the first difference; and (b9) projecting the rectangular picture on the projection area according to the optimal trapezoid column correction grade.

16. The storage medium according to claim 12, wherein the trapezoid row correction grade comprises twenty correction grades from a −10 grade to a +10 grade, and the trapezoid column correction grade comprises twenty correction grades from a −10 grade to a +10 grade.

\* \* \* \* \*